US012705990B2

(12) United States Patent
Sameer et al.

(10) Patent No.: US 12,705,990 B2
(45) Date of Patent: Aug. 11, 2026

(54) SYSTEM AND METHOD FOR GENERATING NAVIGATION INSTRUCTIONS

(71) Applicant: HERE Global B.V., Eindhoven (NL)

(72) Inventors: Priyank Sameer, Mumbai (IN); Samee Azmi, Thane (IN)

(73) Assignee: HERE Global B.V., Eindhoven (NL)

( * ) Notice: Subject to any disclaimer, the term of this patent is extended or adjusted under 35 U.S.C. 154(b) by 78 days.

(21) Appl. No.: 18/392,806

(22) Filed: Dec. 21, 2023

(65) Prior Publication Data

US 2025/0209928 A1 Jun. 26, 2025

(51) Int. Cl.

*G08G 5/55* (2025.01)
*G08G 5/34* (2025.01)
*G08G 5/57* (2025.01)
*G08G 5/59* (2025.01)

(52) U.S. Cl.

CPC ................. *G08G 5/55* (2025.01); *G08G 5/34* (2025.01); *G08G 5/57* (2025.01); *G08G 5/59* (2025.01)

(58) Field of Classification Search

CPC .. G08G 5/55; G08G 5/57; G08G 5/59; G08G 5/34

See application file for complete search history.

(56) References Cited

U.S. PATENT DOCUMENTS 10,416,677 B2 9/2019 Dean et al.
12,125,392 B1 * 10/2024 Colpitts .................. G08G 5/76
2018/0101782 A1 4/2018 Gohl et al.
2019/0146508 A1 5/2019 Dean et al.
2020/0207474 A1 * 7/2020 Foggia ................. G05D 1/0676
2021/0358310 A1 * 11/2021 Sachs ........................ G08G 5/22
2023/0054373 A1 * 2/2023 Brooks ............ G06Q 10/06311
2024/0084762 A1 * 3/2024 Murphy .................. F02K 1/008

FOREIGN PATENT DOCUMENTS

CA 3035970 A1 3/2018
CN 114460972 A 5/2022

OTHER PUBLICATIONS

Babel, "Three-dimensional Route Planning for Unmanned Aerial Vehicles in a Risk Environment", J Intell Robot Syst (2013) 71, Published online: Aug. 31, 2012, pp. 255-269.

* cited by examiner

*Primary Examiner* — Jay Khandpur
(74) *Attorney, Agent, or Firm* — IDITTHAVONG, STEINER & MLOTKOWSKI

(57) ABSTRACT

A system for generating navigation instructions for delivery of a cargo is provided. The system is configured to obtain geographic area information relating to a geographic area, determine cargo information relating to the cargo, determine one or more aerial routes for a delivery of the cargo based on the geographic area information and the cargo information, estimate a risk value for navigation of an aerial vehicle across each of the one or more aerial routes, identify an aerial route from the one or more aerial routes having lowest estimated risk value based on the estimated risk values for the one or more aerial routes, and generate the navigation instructions for navigation of the aerial vehicle along the identified aerial route for delivery of the cargo.

20 Claims, 6 Drawing Sheets

SYSTEM AND METHOD FOR GENERATING NAVIGATION INSTRUCTIONS

TECHNOLOGICAL FIELD

The present disclosure generally relates to generating navigation instructions, and more particularly relates to systems and methods for generating navigation instructions for navigation of an aerial vehicle.

BACKGROUND

In recent years, use of aerial vehicles has increased manifolds across various service sectors. For example, aerial vehicles are used increasingly as cost-effective solutions for last-mile deliveries, agriculture and livestock management, photography, construction, etc. The increasing number of aerial vehicles may potentially become a major contributor in urban low-altitude air traffic. For example, a large number of aerial vehicles may enter the low-altitude airspace, thereby creating problems associated with low-altitude air traffic management. The development of autonomous routing and navigation techniques for the aerial vehicles is crucial in handling low-altitude air traffic and operations of aerial vehicles efficiently and safely. In this regard, low-altitude airspace may need to be assessed for determining a level of risk that may be encountered by an aerial vehicle during its operation for ensuring reliable, secure, and efficient autonomous routing and navigation of the aerial vehicle.

As may be noted, assessment of the low-altitude airspace for aerial vehicle navigation may be complex due to, for example, buildings, security restrictions, environmental factors, etc. Moreover, such assessment of the low-altitude airspace may vary for different types of aerial vehicles. To this end, it becomes crucial to accurately estimate risks of aerial routes for ensuring safety and reliability of navigation operations performed by aerial vehicles within low-altitude airspace.

BRIEF SUMMARY OF SOME EXAMPLE EMBODIMENTS

In order to solve the foregoing problem, the present disclosure may provide a system, a method and a computer programmable product that generates navigation instructions for enabling navigation of aerial vehicles. The present disclosure provides techniques for estimating risk values for aerial routes in a geographic area. In an example, an estimated risk for each of the aerial routes may be used for generating the navigation instructions for the aerial vehicle.

The embodiments of the present disclosure are based on the understanding that estimating risk values for the aerial routes may enable a service provider to make critical decisions relating to routing and navigations for aerial vehicles. The risk values may enable optimized flight planning to ensure safe, efficient, and precise navigation of the aerial vehicles. In addition, estimating risk values for the aerial routes may also ensure efficient air traffic management and airspace planning. The estimated risk values for the aerial routes may be utilized to enable operation control of the aerial vehicles in low-altitude airspace across the geographic area while ensuring path planning based on minimum risk for travelling in the airspace.

It may be noted that managing air traffic in low-altitude airspace may be complex owing to different types of aerial vehicles, different loads or tasks, and different geographic area specifications. To this end, conventional risk estimation techniques may fail to assess risks and hazards for aerial routes in the low-altitude airspace owing to the complexity of the low-altitude airspace. Moreover, it is crucial to addresses traffic safety of aerial vehicles in order to promote efficient use of aerial vehicles, specifically, unmanned aerial vehicles (UAVs).

A system, a method and a computer programmable product are provided for implementing the process for generating navigation instructions for navigation of an aerial vehicle for delivery of a cargo.

In one aspect, a system for generating navigation instructions is disclosed. The system comprises a memory configured to store computer executable instructions and one or more processors configured to execute the instructions to obtain geographic area information relating to a geographic area; determine cargo information relating to a cargo; and determine one or more aerial routes for a delivery of the cargo based on the geographic area information and the cargo information. The processor is further configured to estimate a risk value for navigation of an aerial vehicle across each of the one or more aerial routes; identify an aerial route from the one or more aerial routes having a lowest estimated risk value for the delivery of the cargo based on the estimated risk values for the one or more aerial routes; and generate navigation instructions for navigation of the aerial vehicle along the identified aerial route for the delivery of the cargo.

In additional system embodiments, the one or more processors are further configured to execute the instructions to identify a plurality of risk parameters based on the geographic area information and the cargo information. The processor is further configured to estimate the risk value for each of the one or more aerial routes based at least in part on the plurality of risk parameters.

In additional system embodiments, the one or more processors are further configured to execute the instructions to determine an energy consumption estimation for each of the one or more aerial routes for the navigation of the aerial vehicle based on the geographic area information and the cargo information; and estimate the risk value for each of the one or more aerial route based at least in part on the corresponding energy consumption estimation.

In additional system embodiments, the one or more processors are further configured to execute the instructions to obtain aerial vehicle attributes associated with the aerial vehicle; and determine the energy consumption estimation for each of the one or more aerial routes based on the cargo information, the geographic area information, and the vehicle attributes. The processor is further configured to estimate the risk value for the one or more aerial routes for the navigation of the aerial vehicle carrying the cargo based at least in part on the energy consumption estimation.

In additional system embodiments, the one or more processors are further configured to execute the instructions to identify the aerial route from the one or more aerial routes for the delivery of the cargo based on the aerial vehicle attributes, the cargo information, and the geographic area information.

In additional system embodiments, the obtained geographic area information comprises at least one of: building information, floor value data, and location information.

In additional system embodiments, a first risk value for a first aerial route from the one or more aerial routes is greater than a second risk value for a second aerial route from the one or more aerial routes when, at let one of: a floor value of the first aerial route is greater than a floor value of the second aerial route, a trajectory curvature angle of the first aerial route is greater than a trajectory curvature angle of the second aerial route.

In additional system embodiments, the cargo information includes at least one of: weight information, dimension information, source location, destination location, and delivery instructions for the delivery of the cargo.

In another aspect, a method for generating navigation instructions is disclosed. The method comprises obtaining geographic area information relating to a geographic area from; determining cargo information relating to a cargo; and determining one or more aerial routes for a delivery of the cargo based on the geographic area information and the cargo information. The method further comprises estimating a risk value for navigation of an aerial vehicle across each of the one or more aerial routes; identifying an aerial route from the one or more aerial routes having lowest estimated risk value based on the estimated risk values for each of the one or more aerial routes; and generating navigation instructions for the navigation of the aerial vehicle along the identified aerial route for the delivery of the cargo.

In yet another aspect, a computer program product for estimating risk value for an aerial route is disclosed. The computer program product comprises a non-transitory computer readable medium having stored thereon computer executable instructions which when executed by at least one processor, cause the processor to carry out operations. The operations comprise obtaining geographic area information relating to a geographic area; determining cargo information relating to a cargo; and determining one or more aerial routes for a delivery of the cargo based on the geographic area information and the cargo information. The method further comprises estimating a risk value for navigation of an aerial vehicle across each of the one or more aerial routes; identifying an aerial route from the one or more aerial routes having lowest estimated risk value based on the estimated risk values for each of the one or more aerial routes; and generating navigation instructions for the navigation of the aerial vehicle along the identified aerial route for the delivery of the cargo.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
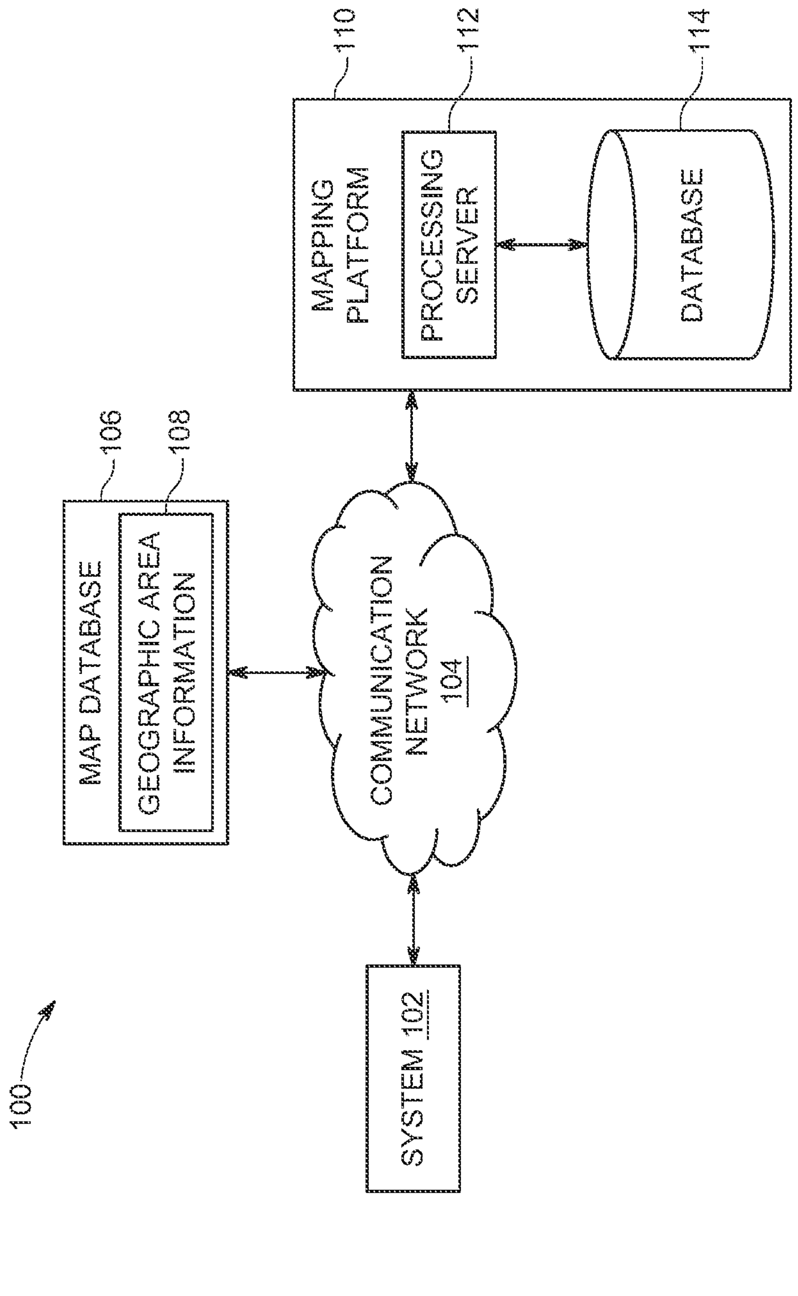
Figure 2:
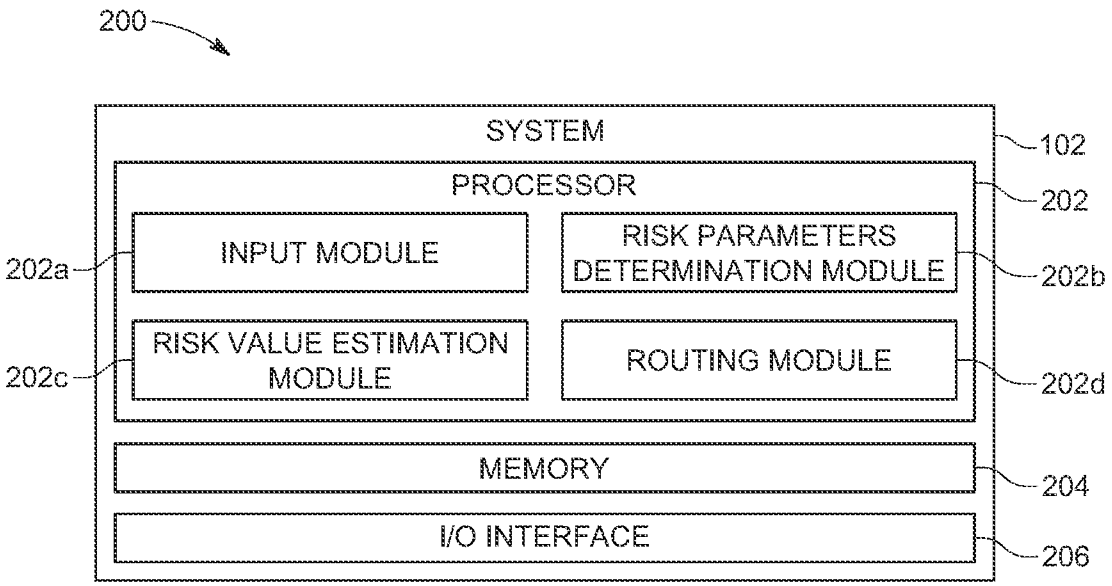
Figure 3:
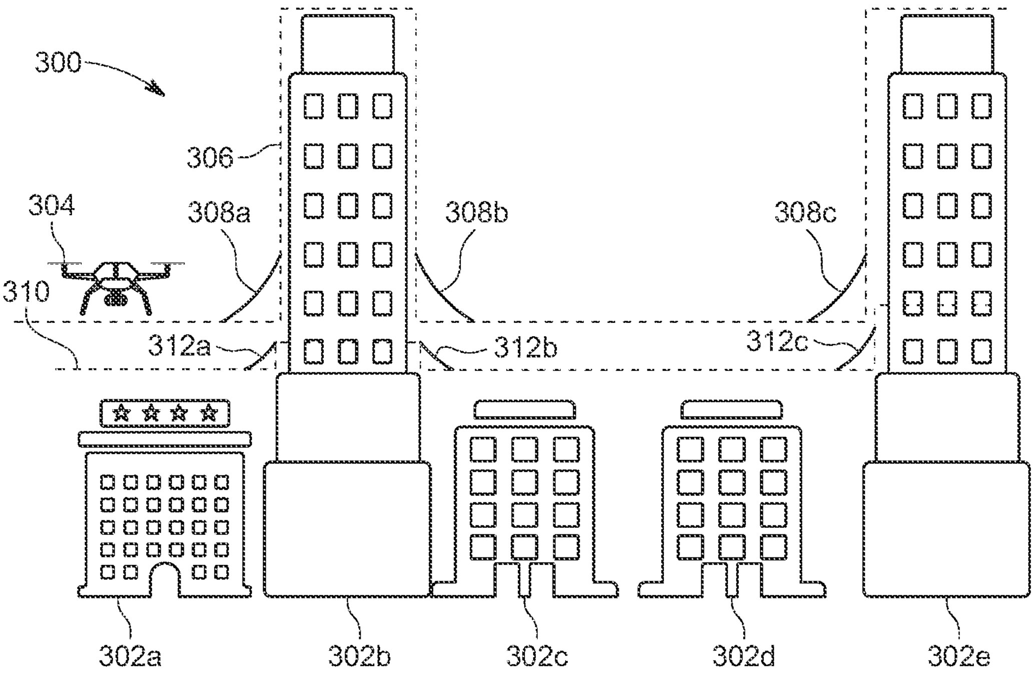
Figure 4:
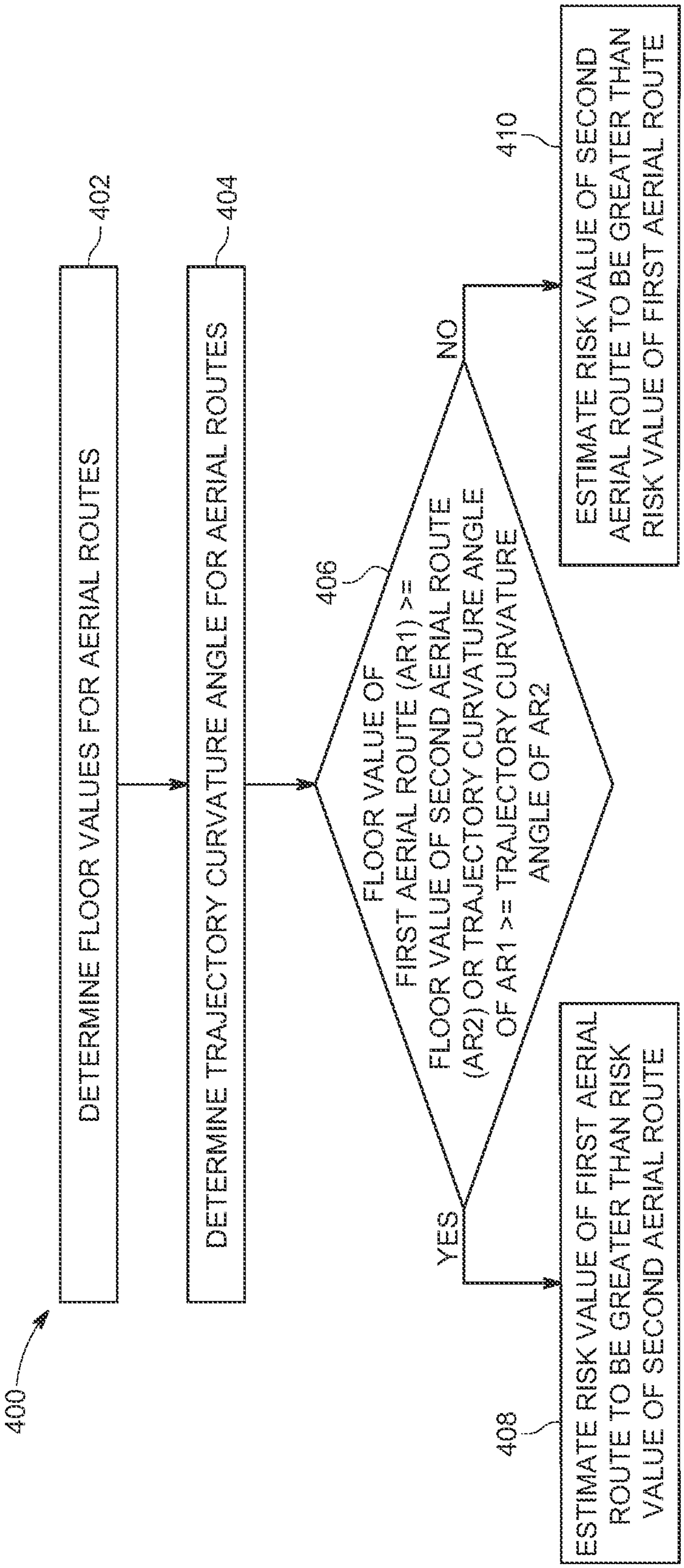
Figure 5:
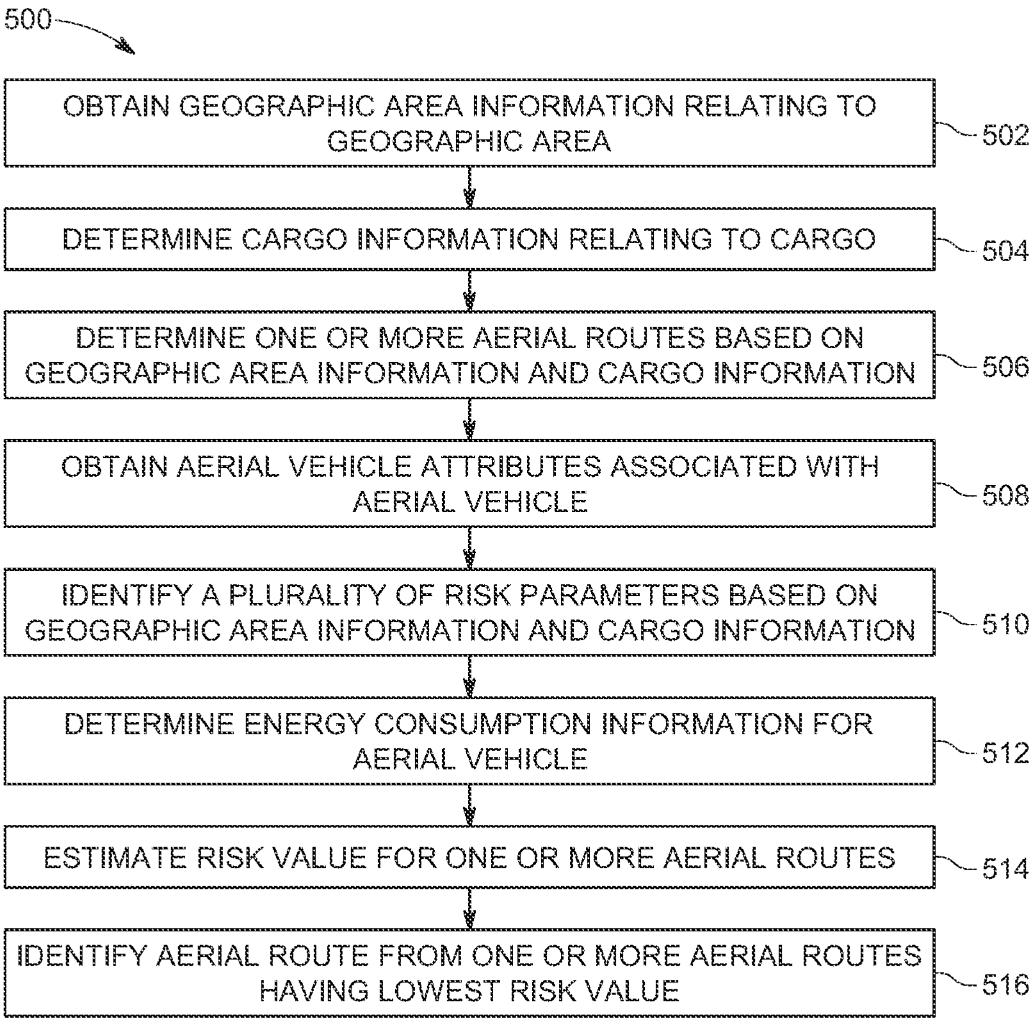
Figure 6:
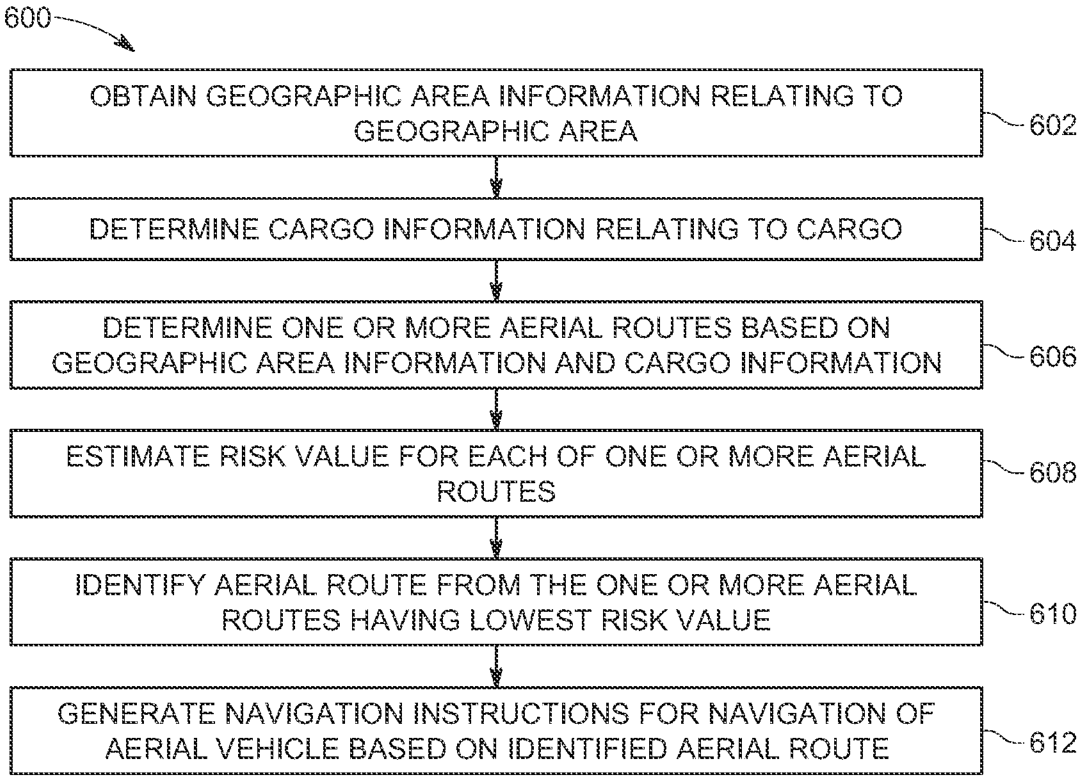

Having thus described example embodiments of the invention in general terms, reference will now be made to the accompanying drawings, which are not necessarily drawn to scale, and wherein:

FIG. 1 illustrates a block diagram of a network environment where a system for generating navigation instructions for a delivery of a cargo is implemented, in accordance with an embodiment of the present disclosure;

FIG. 2 illustrates a block diagram of the system for generating navigation instructions for a delivery of a cargo, in accordance with an example embodiment of the present disclosure;

FIG. 3 illustrates an example geographic area, in accordance with an example embodiment of the present disclosure;

FIG. 4 illustrates a flowchart of a method for identifying an aerial route for a delivery of a cargo, in accordance with an example embodiment of the present disclosure;

FIG. 5 illustrates a flowchart of an example method for estimating risk values for the aerial routes in a geographic area, in accordance with an embodiment of the present disclosure; and FIG. 6 illustrates a flowchart of an example method for generating navigation instructions for delivery of a cargo, in accordance with an example embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown.

Definitions

The term "aerial vehicle" may refer to an autonomous, semi-autonomous or manual automotive vehicle that may use one or more electric motors for propulsion above ground surface, i.e., in air. In an example, the electric motors may be powered or propelled by electricity from extravehicular sources or a battery system. In an example, an aerial vehicle may use a traction battery pack to power the electric motor. For example, the battery pack may be plugged to a power outlet or charging equipment, for charging. For example, the aerial vehicle may include charging port, battery pack, converters, one or more electric motors, charger, controller, cooling system, and transmission connects. In an example, the aerial vehicle may be an unmanned aerial vehicle, such as a drone. Throughout the present disclosure, the term "aerial vehicle" is used interchangeably with "drones".

The term "aerial route" may refer to a planned or a developed path that may be used by an aerial vehicle to reach from one point, such as a source or departure point to another point, such as a destination point. For example, the aerial route may be a path between the source point and the destination point, or a part of a path between the source point and the destination point.

The term "cargo" refers to all types of items and/or packaging suitable for delivery or carrying and may be known by other terms including but not limited to object, freight, payload, goods, package, parcel, box, bag, shrink-wrap, blister pack, electronic device, or some combination thereof.

The term "geographic area" may refer to an area or a portion of Earth's surface. A geographic area may include physical structures, such as buildings, mountains, bridges, electric or communication towers, or the like. For example, a size of the geographic area may vary, for example, from square meters to hundreds of kilometers. In an example, the geographic area may correspond to a geographic location or a combination of geographic locations. Moreover, the geographic area may include spaces such as lithosphere, atmosphere, hydrosphere, and biosphere associated with the corresponding geographic location(s).

For example, within a metropolitan city, a geographic area may include land area and airspace covered by, for example, a building, a building complex, a locality, a water body, public places, community resources, etc. For example, the geographic area may be formed within a defined imaginary or real boundary or borders, such that a spatial area of the geographic area may include an aerial route for enabling navigation of aerial vehicles there through. In an example, the geographic area may be an area that an aerial vehicle may have to travel through when navigating from a source point to a destination point.

The term "risk value" may refer to an estimate or a forecast of a probability or an impact of an occurrence of an incident or a hazard. For example, the risk value may provide an estimated forecast of a level of risk associated with travelling on an aerial route across a geographic area. The risk value may indicate a likelihood of occurrence of an incident or hazard while travelling along the aerial route.

End of Definitions

For example, the conventional risk estimation methods may rely on environmental factors to determine risk for a route. In certain cases, the estimation of risk for a route may be performed manually based on a user's knowledge or human judgment. However, estimated risk for a route based on environmental factors and/or human judgements may be inaccurate, may not be suitable in cases where the aerial vehicle is carrying a cargo for delivery. For example, such estimated risk may not consider the individual cargo specification while calculating aerial route, specifically, for navigation and control of unmanned aerial vehicles (UAVs). Each cargo has different specifications in terms of weight and dimensions. Thus, each cargo may pose different hazards and risk factors, that may have the potential to cause harm to UAVs.

Further, determining risk for an aerial route accurately may be crucial to create awareness of hazards and risks, determine a control program for controlling a hazard or a risk, prevent occurrence of a hazard or introduce precautionary measures to reduce risk, ensure safety and security, enhance operation, while delivery of cargo through aerial vehicle. Embodiments of the present disclosure provide a system, a method, and a computer program product for generating navigation instructions based on estimated risk values for one or more aerial routes of a geographic area. For example, estimation of risk values for aerial routes for navigation may be used to remove or minimize levels of risk to ensure safe, secure, and effective navigation operation for delivery of cargo.

Various embodiments are provided herein for estimating risk values for one or more aerial routes, such that risk values may be used to generate optimal navigation instructions. The risk values may be used for determining, for example, an optimal route for delivery of a cargo or a shipment to avoid any risks or hazards. Further, the risk values for different aerial routes may be used for regulating air traffic to ensure effective and secure navigations of aerial vehicles, for example, cargo delivery. In this manner, map databases for low-altitude aerial navigations may be improved based on risk values for different aerial routes.

FIG. 1 illustrates a block diagram 100 of a network environment comprising a system 102 implemented for estimating a risk value for each of one or more aerial routes in a geographic area and generating navigation instructions for the aerial vehicle for a delivery of a cargo, in accordance with an example embodiment. In an example, the geographic area may include a geographic and/or three-dimensional ground area and low-altitude airspace present above the ground area. For example, the ground area of the geographic area may have a plurality of buildings or other infrastructures, such as bridges, complexes, etc., extending towards the airspace. In this regard, a low-altitude airspace above/around the plurality of buildings or the other infrastructure may be used as aerial routes. In an example, the geographic area may include one or more aerial routes for enabling navigation of aerial vehicles therethrough. For example, different aerial routes may be created for different sets of buildings or infrastructures. As a result, flying conditions or flight parameters across the different aerial routes may vary.

In urban or semi-urban areas, there might be a number of physical structures, such as buildings, trees, flyovers, bridges, lampposts, billboards, electricity cables, etc. Due to varying dimensions of the physical structures, variations in environment conditions, and variations in aerial vehicle features and variation in a cargo features, risk estimations for different aerial routes may vary for different aerial vehicles. For example, an aerial route may be formed in the geographic area across a set of high-rise buildings. In another example, an aerial route may be formed in the geographic area across a waterbody and an open ground area. To this end, risk estimations for the aerial routes may be different. In an example, navigation of an aerial vehicle across an aerial route have high rise and low rise buildings may be risky as the aerial vehicle may have to expend large amount of energy to travel a vertical distance, i.e., gain altitude, while carrying a heavy cargo, that may render the aerial vehicle prone to, risks, faults, high energy expenditure, etc.

To address the aforesaid technical challenges, the system 102 of FIG. 1 introduces a capability to accurately estimate risk value of the one or more aerial routes in the geographic area. To this end, navigation service providers may use risk value of the one or more aerial routes in the geographic area to find a reliable and efficient aerial route and optimize navigation of aerial vehicles to ensure successful operation of aerial vehicles in, for example, safe and secure cargo delivery.

In an example, the system 102 may be coupled with a map database 106 and/or the mapping platform 110, via the communication network 104. In an embodiment, the system 102 may be coupled to one or more communication interfaces, for example, as a part of a routing system, a navigation app, and the like.

All the components in the diagram 100 may be coupled directly or indirectly to the communication network 104. The components described in the diagram 100 may be further broken down into more than one component and/or combined together in any suitable arrangement. Further, one or more components may be rearranged, changed, added, and/or removed. In an example embodiment, the system 102 may be the processing server 112 of the mapping platform 110 and therefore may be co-located with or within the mapping platform 110. In accordance with an embodiment, the map database 106 may be the database 114 of the mapping platform 110 and therefore may be co-located with or within the mapping platform 110. The map database 106 may be configured to receive, store, and transmit data that may be collected from vehicles travelling throughout the geographic area. The system 102 may comprise suitable logic, circuitry, and interfaces that may be configured to estimate a risk value for facilitating navigation of aerial vehicles.

In operation, the system 102 is configured to obtain geographic area information 108 relating to a geographic area from the map database 106. For example, the geographic area may be a locality, a city, a state, and so forth. The geographic area may include the buildings—or any other type of physical structure, such as bridges, hills, trees, etc. As may be noted, the buildings—and/or other physical structures are built over the geographic and/or three-dimensional ground area and may occupy space vertically to the ground. Moreover, there may be a spatial region vertically above the ground, i.e., in an air space, that may be used for navigation of aerial vehicles, such as UAVs or drones. In an example, the geographic area information may be obtained based on location information relating to the geographic area, an identifier associated with the geographic area, etc.

It may be understood that the embodiments of the present example describe the geographic area having buildings and/or other physical structures. However, this should not be construed as a limitation. In other examples of the present disclosure, the geographic area may include other physical structures of different dimensions or no physical structure above the ground.

The geographic area information may include, but may not be limited to, building information, floor value data, and location information. The floor value data may indicate a number of floors and/or floor level information relating to the buildings in the geographic area. In an example, the floor value data may be numerical, alphabetic, or alphanumeric. Moreover, the building information may include, for example, height information of the buildings, building shape, building design, building identifiers, etc. In one example, the building information may also indicate a source building from where a cargo is picked up and/or a destination building to which the cargo is to be dropped. In addition, the location information may include geolocation corresponding to each building within the geographic area.

Further, the system 102 is configured to determine cargo information relating to a cargo. The cargo may be an object that may be carried by an aerial vehicle for delivery. In an example, the cargo information may be received from a sender, a courier service, a carrier, a customer, a sender organization, etc. The cargo information may include information relating to the manner in which the cargo is to be handled or delivered and other physical information regarding the cargo. The cargo information may include, but is not limited to, weight information of the cargo, dimension information of the cargo, source location for pick-up of the cargo, destination location for delivery of the cargo, and other delivery instructions associated with the delivery of the cargo.

Thereafter, the system 102 is configured to determine one or more aerial routes for the delivery of the cargo based on the geographic area information and the cargo information. In particular, based on the source location i.e., a building corresponding to source location and the destination location, i.e., a building corresponding to the destination location, one or more aerial routes may be identified. The one or more aerial routes may connect the source location with the destination location in a same or different manner. For example, the different aerial routes may have different flying parameters. For example, a first aerial route may be short but may require flying over multiple buildings of varying heights, thus require continuous change in flying altitude, whereas a second aerial route may be longer but may require flying over open ground area and a water body without much altitude change. Such examples of the aerial route are only exemplary and should not be construed as a limitation.

The system 102 is further configured to estimate a risk value for navigation of the aerial vehicle across each of the one or more aerial routes in the geographic area. In an example, the system 102 may be configured to estimate the risk values for the aerial routes based on the geographic area information and the cargo information. The risk value for an aerial route may indicate a level of risk in transporting the cargo along the aerial route across the geographic area. The system 102 may be configured to identify a plurality of risk parameters that may cause harm or risk to the aerial vehicle and/or the cargo. Based on the identified plurality of risk parameters, the risk value may be estimated to determine a probability or likelihood of occurrence of an incident and/or a severity of the incident while travelling on the aerial route in the geographic area. In certain cases, the risk values for the aerial routes may be estimated based on, for example, weight of the cargo, dimensions of the cargo, distance of the aerial routes, trajectory curvature angle of the aerial routes, aerial vehicle attributes (such as how much load can be carried by the aerial vehicle), time window for the delivery, delivery priorities, restrictions, and real-time updates (such as weather information, traffic updates, real-time tracking data, etc.).

Based on the estimated risk values for the one or more aerial routes, the system 102 is configured to identify an aerial route having the lowest estimated risk value for the delivery of the cargo. For example, the identified aerial route may be the aerial route selected for the delivery of the cargo. The identified aerial route may ensure enhanced security during the delivery of the cargo.

The system 102 is further configured to generate navigation instructions for navigation of the aerial vehicle along the identified aerial route for the delivery of the cargo. In an example, navigation instructions may be generated based on map data relating to the identified aerial route. For example, the navigation instructions may include textual information, graphical information, and/or audio information indicating instructions for navigating along the identified aerial route. The navigation instructions may also include, for example, relevant and/or expected timings, relevant landmarks, speed limits, real-time traffic updates, etc. The generated navigation instructions for the identified aerial route may ensure safe navigation of the aerial vehicle through the geographic area for the delivery of the cargo.

To this end, the system 102 is configured to receive a request for delivery scheduling or navigation instructions generation for delivery of different cargos. Further, based on cargo information and geographic area information, the system 102 is configured to determine the one or more possible aerial routes for the delivery of each of the cargos. Moreover, the system 102 is configured to estimate risk values for each of the one or more possible aerial routes for delivery of each of the cargos and identify an optimal aerial route for the delivery of the cargos.

FIG. 2 illustrates an exemplary block diagram 200 of the system 102, in accordance with one or more example embodiments. FIG. 2 is explained in conjunction with FIG. 1.

The system 102 may include at least one processor 202, a memory 204, and an I/O interface 206. In accordance with an embodiment, the system 102 may retrieve data from the map database 106, the database 114 and/or other databases associated with the system 102.

In an example embodiment, the processor 202 is configured to estimate risk value of the one or more aerial routes across the geographic area. The processor 202 may estimate the risk value for the aerial routes based on the geographic area information 108 of the geographic area and cargo information.

Further, the processor 202 is configured to collect and/or analyze data from the memory 204, and/or any other data repositories available over the communication network 104 to estimate the risk value associated with the one or more aerial routes. The processor 202 may comprise modules, depicted as an input module 202*a*, a risk parameters determination module 202*b*, a risk value estimation module 202*c*, and a routing module 202*d*.

The I/O interface 206 may receive inputs and provide outputs for end user to view, such as render estimated risk values, render navigation instructions, etc. In an example embodiment, the I/O interface 206 may present information relating to location of the geographic area on a map, visual representation of the identified aerial route for navigation, other navigation instructions, etc. It is further noted that the I/O interface 206 may operate over the communication network 104 to facilitate the exchange of information.

The above presented components of the system 102 can be implemented in hardware, firmware, software, or a combination thereof. Though depicted as a separate entity in FIG. 1, it is contemplated that the system 102 may be implemented as a module of any of the components of the mapping platform 110.

The processor 202 may retrieve computer executable instructions that may be stored in the memory 204 for execution of the computer executable instructions. In accordance with an embodiment, the processor 202 is configured to retrieve input, such as real-time sensor data, historical probe data, map data, geographic area information 108, cargo information and aerial vehicle attributes; and give output, such as estimated risk values, navigation instructions, notification associated with flying and/or landing for use by the end user, through the I/O interface 206.

The processor 202 of the system 102 is configured to estimate risk values for the one or more aerial routes of the geographic area. In an example, the processor 202 may be configured to use ML models to estimate the risk values for the one or more aerial routes.

Pursuant to an example embodiment, the input module 202*a* may be configured to receive input data. In an example, the input data may be received from, for example, the map database 106, a user input, and/or other databases associated with the system 102, a user of the system 102, an aerial vehicle, a navigation or delivery operation service provider, etc. The input data may include the geographic area information 108 relating to the geographic area, the cargo information relating to the cargo, and vehicle attributes relating to the aerial vehicle. For example, one or more sensors may also be used to obtain the input data.

The geographic area information 108 received by the input module 202*a* may include, for example, information relating to relating to buildings and/or other physical structures within the geographic area, floor value data (e.g., value of a number of floors of buildings or other physical structures present in the geographic area), weather information (e.g., humidity, sunlight, precipitation, rain, thunder, etc.), building information relating to the buildings (e.g., floor value, location, building shape, building size, open area associated with the buildings, etc.), traffic information (e.g., a number of aerial vehicles that may be configured to or are about to travel along the aerial route), geolocations relating to the buildings and/or the other physical structures, or a combination thereof.

Further, the cargo information received by the input module 202*a* may include, for example, weight information of the cargo (e.g., weight in grams, kilograms, pounds, etc.), dimension information of the cargo (e.g., dimension in millimeters, centimeters, meters, feet, inches, etc.), source location, destination location, and other delivery instructions associated with delivery of the cargo. For example, the delivery instructions associated with delivery of the cargo may indicate a desired manner in which the cargo should be transported by the aerial vehicle, such as priority, preferred path, preferred time, preferred aerial vehicle, preferred risk value, etc. In one example, the delivery instructions include a preference to stay closer to building or ground surface to avoid dropping of the cargo from high floor values. In another example, the delivery instruction may include using a certain type of UAV for the delivery of the cargo. In addition, the aerial vehicle attributes received by the input module 202*a* may include, for example, battery health, battery age, aerial vehicle age, configuration, mode of flying, sensor information, endurance, coverage area or flying range, weight, flight altitude, flying speed, wind resistance, operating temperature range, dimensions, weight, load handling capacity, etc.

In one example, the geographic area information 108 relating to the geographic area may be obtained from the map database 106 or the database 114, based on location data associated with the geographic area. Moreover, the cargo information may be obtained from a database associated with the cargo, a transportation service provider, and/or the aerial vehicle, for example, based on an identifier associated with the cargo and/or the aerial vehicle.

Once the geographic area information 108, the cargo information and the aerial vehicle attributes are obtained, the processor 202 is configured to determine one or more aerial routes for a delivery of the cargo. In an example, the one or more aerial routes may be potential routes for the delivery of the cargo. The one or more aerial routes may connect the source location with the destination location in different manner. For example, the one or more aerial routes may include alternative paths that can be taken to reach the destination location from the source location. Such alternative paths may offer choices based on various factors, such as distance, area, time, traffic, flight height or floor values, etc.

Thereafter, the risk parameters determination module 202*b* is configured to identify a plurality of risk parameters based on the geographic area information and the cargo information. The risk parameters determination module 202*b* may identify possible attributes or risk parameters that may cause potential risks or hazards associated with different aerial route options when planning the delivery of the cargo or navigation of the aerial vehicle. Examples of the risk parameters may include, but are not limited to, weight of the cargo, dimensions of the cargo, or floor values for the aerial routes, trajectory curvature angles of the aerial routes, distance of the aerial routes, and aerial vehicle performance. In certain cases, each of the identified risk parameters may be assigned a corresponding weight based on a level at which the risk parameters affect the risk value. For example, weight of the cargo may have a higher weight as weight of the cargo may impact durability and battery of the aerial vehicle as well as floor values that the aerial vehicle can climb thereby affecting risk estimations considerably, whereas distance of the aerial routes may have a lower weight when the floor values of the aerial routes is not very high. Once the plurality of risk parameters is identified for the risk value estimations, values of the parameters are evaluated to estimate the risk value for the aerial routes.

Further, the processor 202 is configured to estimate a risk value associated with each of the one or more aerial routes in the geographic area based on the obtained input data. In particular, the risk value estimation module 202*c* is configured to estimate the risk value for each of the one or more aerial routes based on the plurality of risk parameters and the input data. After the plurality of risk parameters are identified, the risk value estimation module 202*c* may determine a value for the plurality of risk parameters based on the input data. In an example, given a risk parameter "weight of cargo", the risk value estimation module 202*c* may determine a value of the weight, say "X kgs" of the cargo. In another example, given a risk parameter "flight heigh of aerial route", the risk value estimation module 202*c* may determine a value of the number of floors buildings below an aerial route, say "30 floors", "8 floors", or a combination of floors, for each of the one or more aerial vehicles. In this manner, based on different risk parameters, different values may be determined for each of the one or more routes.

Thereafter, the risk value estimation module 202*c* is configured to estimate the risk value for the aerial routes based on the risk parameters and the corresponding values. The estimated risk value for each of the aerial routes indicates a risk associated with travelling of the aerial vehicle along the corresponding aerial routes. Details of the determination of the risk value for the aerial routes based on the risk parameters and the input data are described in conjunction with, for example, FIG. 5.

In certain cases, an energy consumption for navigation of the aerial vehicle may also be estimated. In this regard, the processor 202 may be configured to determine energy consumption information for the aerial vehicle based on the cargo information, the geographic area information, and the aerial vehicle attributes. For example, weight, dimensions, delivery instruction for the cargo, floor value for an aerial route, battery health and battery consumption of the aerial vehicle for travelling on the aerial route may be used to estimate the energy consumption for the aerial route. For example, if the weight of the cargo is low, then high-capacity aerial vehicle may not be required. Moreover, due to the low weight of the cargo, power expended in travelling along an aerial route may be low. Therefore, energy consumption for the low weight cargo may be less. However, if the weight of the cargo is high, then an advanced aerial vehicle having a high capacity may be required. Moreover, gaining altitude may require more battery power expenditure. As a result, energy consumption for a cargo having high weight may be high. Subsequently, the energy consumption for each of the one or more aerial routes may be estimated based on the aerial vehicle attributes, the geographic area information 108 and the cargo information.

In an example, the risk value estimation module 202*c* may also store the received cargo information, the aerial vehicle attributes, the determined risk parameters, and the risk value estimations for the one or more aerial routes within a database, such as the database 114. Although the embodiments of the present examples are defined in terms of estimating risk values for the one or more aerial routes in the geographic area, however, this should not be construed as a limitation. In other embodiments of the present disclosure, the techniques described herein may be used to estimate risk values for each of aerial routes across different geographic areas.

In an example, the risk values for the aerial routes from the risk value estimation module 202*c* may then be fed to the routing module 202*d*. The routing module 202*d* may be configured to generate user readable or user-understandable navigation instructions, such as routing messages, notifications, warning messages, etc., based on the estimated risk values. The routing module 202*d* may send or push the routing messages to user equipment, such as user equipment on-board an aerial vehicle performing the delivery of the cargo, to enable routing of the aerial vehicle along an identified aerial route having lowest risk value for the delivery of the cargo. The routing module 202*d* may also send or push routing messages to other user equipment associated with other aerial vehicles that are not travelling on the identified aerial route to manage or plan a route based on the risk values.

The processor 202 may retrieve computer executable instructions that may be stored in the memory 204 for execution of the computer executable instructions. The memory 204 may store the received input data associated with the geographic area, the cargo, etc. In accordance with an embodiment, the processor 202 may be configured to retrieve input (such as, real-time sensor data, historical probe data, building data, map data indicating map attributes associated with geographic areas, and other information) from background batch data services, streaming data services or third party service providers, and renders output, such as, the estimated risk value for the aerial routes, navigation instructions for the identified aerial route, and notifications associated with the processing of input data for use by an end user on aerial vehicles or other user equipment through the I/O interface 206.

The memory 204 of the system 102 may be configured to store a dataset that may include information, such as, but not limited to, the geographic area information 108, probe data, sensor data, building information, aerial vehicle attributes, cargo information, and map data. In accordance with an embodiment, the memory 204 may include processing instructions for processing the data. The dataset may include real-time data and historical data, from service providers.

FIG. 3 illustrates an example geographic area 300, in accordance with an example embodiment. The geographic area 300 includes buildings 302*a*, 302*b*, 302*c*, 302*d*, and 302*e* (collectively referred to as buildings 302). The geographic area 300 may also include other physical structures (not shown), such as bridges, flyovers, lampposts, streetlights, trees, etc. Moreover, the geographic area 300 may include spatial area, such as above the buildings 302, in between the buildings 302, etc.

To this end, the system 102 is configured to obtain geographic area information 108 relating to the geographic area 300. The geographic area information 108 may include building information (e.g., a set of images, location information, outline information, shape information, dimension information, periphery information, height information, rooftop information, shadow information, open area information, an identifier, etc.), floor value data (e.g., number of floors of the buildings 302 in the geographic area 300), and location information relating to the geographic area 300 (e.g., geolocations relating to the buildings of the geographic area 300).

Further, the system 102 may obtain cargo information relating to a cargo that may have to be delivered by an aerial vehicle 304. The cargo information may include, for example, source or pickup location, destination or drop location, weight of the cargo, dimensions of the cargo, delivery instructions associated with the cargo, identifier of the cargo, delivery personnel associated with the cargo, etc. In certain cases, the system 102 may obtain aerial vehicle attributes relating to the aerial vehicle 304. The aerial vehicle attributes may include, for example, battery health, age, sensors information, maximum range, maximum flight altitude, flying speed, area coverage, launch and recovery, wind resistance, operating temperature, dimension of aerial vehicle, load capacity, etc.

To this end, based on the geographic area information and the cargo information, one or more aerial routes in the geographic area 300 may be determined. For example, spatial area in the geographic area 300, location information of the buildings 302 in the geographic area 300, source location for pick-up of the cargo and destination location for the delivery of the cargo may be used to generate the one or more aerial routes. In an example, the geographic area 300 may have a single aerial route 306 or 310 for travelling across the geographic area 300, or multiple aerial routes 306 and 310 for travelling across the geographic area 300.

Once the aerial routes (depicted as the aerial routes 306 and 310) in the geographic area 300 are determined, a risk values for the aerial routes 306 and 310 are estimated. In this regard, a plurality of risk parameters may be identified for risk value estimation. For example, the plurality of risk parameters may include, but are not limited to, floor values of the aerial routes 306 and 310, trajectory curvature information of the aerial routes 306 and 310, weight of the cargo, dimensions of the cargo, energy consumption of the aerial vehicle 304, and battery health of the aerial vehicle 304. Based on the plurality of risk parameters, the values corresponding to the risk parameters may be determined.

In an example, the floor value data of the buildings 302 may also be used to determine a number of floors in the respective buildings 302 and floor values of the aerial routes 306 and 310. The number of floors of the buildings 302 may then be used to determine a floor value of the aerial route 306 and 310 when travelling above, in front or in-between the buildings 302. For example, the building 302*a* may have 7 floors. In such case, as the building 302*a* has a number of floors less than 15 floors, a part of the aerial routes 306 and 310 above the building 302*a* may be considered as low floor value or low altitude. Further, the building 302*b* may have 27 floors. In such case, as the building 302*b* has a number of floors greater than 15 floors but less than 30 floors, a part of the aerial route 306 above the building 302*b* may be considered as medium floor value or medium altitude whereas a part of the aerial route 310 in front of the, for example, 8$^{th}$ floor, of the building 302*b* may be considered as low floor value or low altitude. To this end, if a building has a number of floors greater than 15 floors but less than 30 floors then a part of an aerial route above the building may be considered as medium floor value or medium altitude. Further, if a building has a number of floors greater than 30 floors then a part of an aerial route above such building may be considered as high floor value or high altitude. In this manner, floor values or a combination of floor values for the aerial routes 306 and 310 may be determined based on the floor value data of the buildings 302 associated with the aerial routes 306 and 310. In this manner, floor values for other aerial routes in the geographic area 300 may also be determined.

Moreover, the trajectory curvature information for the aerial routes 306 and 310 may be determined based trajectory curvature angles 308*a*, 308*b* and 308*c* for the aerial route 306, and trajectory curvature angles 312*a*, 312*b* and 312*c* for the aerial route 310. For example, as the building 302*a* is low altitude building and the building 302*b* is high altitude building, therefore, the trajectory curvature angle 308*a* from the building 302*a* up to the top of the building 302*b* for the aerial route 306 is steep, thus the trajectory curvature angle 308*a* is high. In such a case, the energy expenditure may also be high. Further, as the building 302*a* is low altitude building and the trajectory curvature angle 312*a* from the top of the building 302*a* to in front of the building 302*b* along the aerial route 310 is not steep, thus the trajectory curvature angle 312*a* is low. In such a case, the energy expenditure may also be low.

In another example, the weight of the cargo and the dimensions of the cargo may be determined based on the cargo information. For example, if the weight of the cargo is less than 5 kgs, then the weight of the cargo may be considered low; whereas if the weight of the cargo is more than 5 kgs and less than 15 kgs then the weight of the cargo may be considered as medium. Moreover, if the weight of the cargo is more than 15 kgs, then the weight of the cargo may be considered high.

To this end, based on the values corresponding to each of the plurality of risk parameters, a risk value may be estimated for each of the aerial routes 306 and 310. In this manner, based on the geographic area information 108, the cargo information and the aerial vehicle attributes, the system 102 may estimate risk values for the aerial routes 306 and 310 of the geographic area 300.

In certain cases, the system 102 may be configured to obtain information relating to the generated aerial routes 306 and 310. The information relating to the generated aerial routes 306 and 310 may include information relating to current weather data along the aerial routes 306 and 310, historical weather data along the aerial routes 306 and 310, and historical risk data. The historical risk data may indicate, for example, a number or frequency of historical incidents (such as, theft, robbery, collision, failure, UAV abuse, cargo stealing, etc.) against aerial vehicles along the aerial routes 306 and 310, a severity of the one or more historical incidents (e.g., how badly was a UAV affected or destroyed, etc.) and/or a likelihood of occurrence of an incident or hazard. For example, if the frequency of an incident, like robbery or theft, against aerial vehicles along an aerial route is high, in such a case, the likelihood of occurrence of the incident when travelling along the aerial may also be high. The information relating to the generated aerial routes 306 and 310 may also include information relating to lighting present along the aerial routes 306 and 310 or expected or planned traffic along the aerial routes 306 and 310. In an example, such information relating to the aerial routes 306 and 310 may also be used to estimate the risk values for the aerial routes 306 and 310.

In an example, the aerial route 306 may include a combination of low floor value, medium floor value and high floor value. In addition, the trajectory curvature information for the aerial route 306 may indicate trajectory curvature angles 308*a*, 308*b* and 308*c* for the aerial route 306 to be high. It may be noted, as the aerial vehicle 304 may have to cover a high trajectory curvature angles 308*a* and 308*c* for rising from a lower floor to a higher floor rapidly or a high trajectory curvature angle 308*b* for coming down from a high floor to a lower floor, therefore the energy consumption of the aerial vehicle 304 when travelling along the aerial route 306 may be high. To this end, due to high floor value, i.e., floor value corresponding to the parts of the aerial route 306, and high trajectory curvature angles 308*a*, 308*b* and 308*c* along the aerial route 306, an energy consumption estimation for the aerial route 306 may be high. Further, the energy consumption estimation for the aerial route 306 may be further high if the weight of the cargo transported by the aerial vehicle 304 along the aerial route 306 is high, such as more than 15 kgs. To this end, an estimated risk value for the aerial route 306 may also be high owing to the high risk associated with carrying of high weight cargo to large floor value.

With regard to the aerial route 310, the aerial route 310 may include a combination of low floor value and medium floor value. In addition, the trajectory curvature information for the aerial route 310 may indicate trajectory curvature angles 312*a*, 312*b* and 312*c* of the aerial route 310 to be low. It may be noted, as the aerial vehicle 304 may have to cover a low trajectory curvature angles 312*a* and 312*c* for gradual rise from a lower floor to a higher floor or a low trajectory curvature angle 312*b* for gradual lowering from a high floor to a lower floor, therefore the trajectory curvature angles 312*a*, 312*b* and 312*c* for the aerial route 310 may be low. To this end, due to low floor value, i.e., floor value of the aerial route 310, and low trajectory curvature angles 312*a*, 312*b* and 312*c* of the aerial route 310, an energy consumption estimation for the aerial route 310 may be low. Further, the energy consumption estimation may be further low if a weight of a cargo transported by the aerial vehicle 304 along the aerial route 306 is low, say less than 5 kgs. To this end, an estimated risk value of the aerial route 310 may be low owing to low risk associated with carrying of low weight cargo to low floor value.

It may be noted that the geographic area 300 may include other buildings or physical structures and a plurality of aerial routes, such as the aerial routes 306 and the aerial route 310. In an example, based on the low risk value of the aerial route 310, navigation instructions may be generated for the aerial vehicle 304 for the delivery of the cargo. For example, the navigation instructions may provide instructions to enable navigation of the aerial vehicle 304 along the aerial route 310. In this manner, the aerial route 310 is identified for the navigation of the aerial vehicle 304 based on the geographic area information 108, the cargo information and the aerial vehicle attributes.

FIG. 4 illustrates an example method 400 for identifying an aerial route for a delivery of a cargo, in accordance with an example embodiment. Additional, fewer, or different blocks or steps may be provided.

At 402, floor values of a first aerial route, say the aerial route 306 and a second aerial route, say the aerial route 310 are determined. In an example, geographic area information 108 relating to the geographic area 300 indicating the floor value data relating to the buildings 302 associated with the aerial routes 306 and 310 may be used to determine the floor values for the aerial routes 306 and 310. For example, the floor value for the aerial route 306 may be a combination of medium floor values and high floor values, whereas the floor value for the aerial route 310 may be a combination of low floor values and medium floor values.

At 404, trajectory curvature angle is determined for the aerial routes 306 and 310. For example, based on the floor values or combination of floor values of the aerial routes 306 and 310, the trajectory curvature angles may be determined. For example, for the aerial route 306, the trajectory curvature angles 308*a*, 308*b* and 308*c* may be high due to rapid or steep vertical inclination for rising from lower floor to higher floor or for coming down from higher floor to lower floor. On the other hand, for the aerial route 310, trajectory curvature angles 312*a*, 312*b* and 312*c* may be low due to gradual inclination for rising from lower floor to higher floor or for coming down from higher floor to lower floor.

Further, at 406, a determination is made to check if the floor value of the aerial route 306 is greater than or equal to the floor value of the aerial route 310, and if the trajectory curvature angles 308*a*, 308*b* and 308*c* of the aerial route 306 is greater than or equal to the trajectory curvature angles 312*a*, 312*b* and 312*c* of the aerial route 310.

Further, if the floor value of the aerial route 306 is greater than or equal to the floor value of the aerial route 310 and/or the trajectory curvature angle of the aerial route 306 is greater than or equal to the trajectory curvature angle of the aerial route 310 then, at 408, a risk value is estimated for the aerial route 306 to be greater than a risk value for the aerial route 310. To this end, as the risk value for the aerial route 310 is lower than the risk value for the aerial route 306, the aerial route 310 may be identified for the delivery of the cargo.

However, if a floor value of the aerial route 306 is less than a floor value of the aerial route 310 and/or a trajectory curvature angle of the aerial route 306 is less than a trajectory curvature angle of the aerial route 310, at 410, a risk value is estimated for the aerial route 306 to be less than a risk value estimated for the aerial route 310. To this end, as the risk value for the aerial route 306 is lower than the risk value for the aerial route 310, the aerial route 306 may be identified for the delivery of the cargo.

Based on the estimated risk value for the aerial routes 306 and 310, navigation instructions may be generated for the delivery of the cargo. For example, navigation instructions may be generated for the travelling of the aerial vehicle 304 based on the risk values of the aerial routes 306 and 310 across the geographic area 300. A manner in which the risk values are estimated for navigation is described in detail, for example, with FIG. 5.

FIG. 5 illustrates an example method 500 for estimating risk values for the aerial routes 306 and 310 in the geographic area 300, in accordance with an example embodiment. Additionally, fewer or different blocks or steps may be provided. The method 500 is explained in conjunction with elements of FIG. 1, FIG. 2, FIG. 3A, FIG. 3B and FIG. 4.

At 502, geographic area information 108 relating to the geographic area 300 is obtained. The geographic area information 108 may include, for example, floor value data relating to the buildings 302, building information relating to the buildings 302, and location information relating to the buildings 302.

At 504, cargo information relating to a cargo is obtained. The cargo information may include, for example, weight of the cargo, dimensions of the cargo, source or pick-up location, delivery or destination location, and delivery instructions relating to the cargo.

At 506, one or more aerial routes, such as the aerial routes 306 and 310 are determined within the geographic area 300. In an example, the one or more aerial routes 306 and 310 are determined based on the geographic area information, source location and destination location. In an example, based on the source location and the destination location, buildings corresponding to the source location and the destination location may be identified. Further, for example, path finding and/or routing algorithms may be used to determine the one or more aerial routes.

At 508, aerial vehicle attributes relating to the aerial vehicle 304 are obtained. For example, the aerial vehicle 304 may be a UAV or a drone. The aerial vehicle attributes may include, but are not limited to, resource information and configuration information of the aerial vehicle 304. For example, the resource information may indicate information associated with energy resource such as current battery charge status or remaining battery charge, battery operation, battery life, battery health, and the like. Moreover, the configuration information may indicate information associated with type of aerial vehicle 304, weight tolerance of the aerial vehicle 304, range of the aerial vehicle 304, operating temperature for the aerial vehicle 304, maximum altitude hat can be gained by the aerial vehicle 304, a type of control of the aerial vehicle 304, size of the aerial vehicle 304, flying speed of the aerial vehicle 304, weight of the aerial vehicle 304, etc.

At 510, a plurality of risk parameters is identified based on the geographic area information and the cargo information. The identified plurality of risk parameters may indicate certain parameters or features that may cause or contribute to occurrence of certain incidents or hazards, such as disruption in navigation, failure of operation of navigation or delivery, etc. The identified risk parameters may be associated with the geographic area 300, the aerial routes 306 and 310, the aerial vehicle 304 and/or the cargo that may be transported by the aerial vehicle 304. In certain cases, each of the identified risk parameters may be evaluated to determine an impact of the risk parameter on the estimation of the risk value. Moreover, based on an impact of the risk parameter on the estimation, a weight may be assigned to each of the risk parameters. For example, the weight may be dynamic, i.e., weight for a risk parameter may be based on an impact of the risk parameters in estimation of the risk value for a particular aerial route, a particular aerial vehicle, and a particular cargo. Examples of the risk parameters may include, but is not limited to, floor value or combination of floor values of the aerial routes 306 and 310, weight of the cargo, dimensions of the cargo, the trajectory curvature angles of the aerial routes 306 and 310, aerial vehicle battery condition, aerial vehicle maximum flight height, information relating to delivery of the cargo (such as, source location, destination location, one or more possible flying routes, etc.), open area or rooftop information relating to buildings associated with the aerial route, and weather information (such as, possibility of storm, rain, clear sky, etc.).

At 512, energy consumption information for the aerial vehicle 304 is determined. In an example, the energy consumption information may indicate energy consumed by the aerial vehicle 304 for travelling along the aerial routes 306 and/or 310 with the cargo. The energy consumption information may be determined based on the cargo information, the one or more aerial routes or the corresponding geographic area information, and the aerial vehicle attributes. In an example, energy consumption information may be determined based on the cargo information, the aerial vehicle 304 attributes and the geographic area information 108 relating to the geographic area 300 (such as, weather condition, building information, floor value data, location information, etc.). Further, the system 102 may estimate a total amount of energy that may be consumed by the aerial vehicle 304 during navigation through the one or more aerial routes based on a summation or aggregation of energy consumption for travelling along the trajectory curvature angles, vertical acceleration, downward deceleration, travelling in a straight line, landing, and ascending associated with the one or more aerial routes.

As may be noted that due to, for example, travelling with a heavy cargo, travelling to a high altitude, travelling during a bad weather condition (such as wind, rain, etc.), large distance between the source location and the destination location, etc., the aerial vehicle 304 may have to expend more energy. As a result, the energy consumption information may be high for delivery of heavy cargo, for travelling on an aerial route that is high, i.e., have high or combination of low, medium, and high floor values, for travelling in bad weather condition and/or for travelling over a large distance. Alternatively, if weight of a cargo, altitude of the flying route, and distance is less, then the aerial vehicle 304 may have to expend less energy.

At 514, risk values are estimated for the aerial routes 306 and 310. For example, based on each of the plurality of risk parameters, values corresponding to the risk parameters, the geographic area information 108, the cargo information, and the energy consumption information, the risk values may be estimated for the aerial routes 306 and 310.

For example, a determination may be made regarding values of risk parameters. For example, for risk parameter of "floor value", values may be determined as low (say, for floor values between 0 to 8), medium (say, for floor values between 9 to 30), and high (say, for floor values higher than 30 floors), or a combination of different floor values lying in different ranges. Further, a value for the risk parameter "floor value of the aerial routes" may be determined based on the floor values of the aerial routes 306 and 310. For example, for the aerial route 306, value for the risk parameter "floor values" may be determined as a combination of high and medium. Moreover, for the aerial route 310, value for the risk parameter "floor values" may be determined as a combination of low and medium.

In this manner, values may be determined for each of the risk parameters, such as weight of the cargo, dimensions of the cargo, delivery instructions for the cargo, vehicle attributes of the aerial vehicle 304, weather condition of the geographic area 300, historical risk data relating to the aerial routes 306 and 310, traffic information, etc.

For example, if the weight of a cargo is low and the floor value of an aerial route is low, then a risk value for the aerial route based on the weight may be low. In another example, if the weight of a cargo is low and the floor value of an aerial route is high, then a risk value for the aerial route based on the weight may be medium. In yet another example, if the weight of a cargo is high and the floor value of the aerial route is also high, then a risk value for the aerial route based on the weight may be high. In another example, if the floor value of an aerial route is a combination of medium and high floor values or high, e.g., the aerial route 306 includes altitude ranging between 200 feet to 700 feet, and the weight of the cargo is low, then a risk value for the aerial route 306 based on the weight may be medium.

In an example, a likelihood or probability of occurrence of an incident or a hazard, such as robbery, theft, dropping of cargo, failure of aerial vehicle, or any other action that may disrupt navigation of the aerial vehicle 304 or hamper delivery or navigation operation may be determined. In an example, the likelihood value may be determined for the aerial routes based on the risk parameters. In such a case, the likelihood may indicate an impact of the risk parameter in the severity and/or occurrence of the incident or hazards during the operation of the aerial vehicle 304.

For example, if the floor value of an aerial route is high, say 35 floors, then a likelihood of human intervention may be less but there may be chances of fault or failure in operation of the aerial vehicle 304 or dropping of cargo when climbing at such floor value. To this end, such likelihood of occurrence of an incident may also be determined based on the risk parameters. Further, such likelihood may be used to estimate risk value for the aerial routes 306 and 310.

The estimated risk value indicates a level of risk associated with the travelling of the aerial vehicle 304 along the aerial routes 306 and 310 while carrying the cargo. For example, the estimated risk values for the aerial routes 306 and 310 in the geographic area 300 may be high when, for example, a floor value of the aerial routes 306 and 310 is high, and/or the trajectory curvature angle of the aerial routes 306 and 310 is high.

In an example, if the floor value of an aerial route is high and the weight of the cargo is high, then a risk value for the aerial route and the cargo may be high. In an example, individual risk values may be estimated based on different risk parameters and floor values of the aerial routes 306 and 310. Further, an estimated risk value for the aerial routes 306 and 31 may be determined based on aggregation of individual risk values relating to different risk parameters and assigned weights of the different risk parameters. In this manner, risk value may be determined for different aerial routes across same or different geographic areas.

TABLE 1

| Floor values of Aerial routes | Risk Category High Weight of the cargo a) Risk parameter related to weight of the cargo Risk Value |
|---|---|
| High floor only | 24 |
| Middle floor only | 18 |
| Low floor only | 16 |
| Combination of floor values with high trajectory curvature angle | 30 |
| Combination of floor values with low trajectory curvature angle | 28 |
| Combination of floor values with combination of trajectory curvature angles | 15 |

In an example, the Table 1 shows determining risk value for an aerial route based on floor values of the aerial route and weight of the cargo. Pursuant to the present example, the risk value may be a numerical score defined within a range of '0' to '30'. To this end, the risk value to be greater than 25 may indicate critically high risk associated with the aerial route, whereas the risk value to be less than 10 may indicate low risk or safe route associated with the aerial route.

According to the present example, the risk value for aerial route may be estimated by identifying a risk category in which the aerial route lies based on the floor value data (or height) of the aerial route, trajectory curvature information of the aerial route and weight of the cargo. For example, if the weight is high and the floor value of the aerial route corresponds to high floors only risk category then the risk value for the aerial route may be estimated to be high. In this manner, risk values may be determined for other risk parameters, such as dimensions of cargo, weather, traffic, etc. based on the floor values and trajectory curvature angles of the aerial route. It may be noted that considering only weight, floor value, and trajectory curvatures as risk parameters for estimation of the risk value is only exemplary. In other embodiments of the present disclosure individual risk values for each of the aerial routes may be estimated based on other risk parameters, such as dimensions of cargo, weather, traffic, historical risk data, etc.

In an example, if an estimated risk value for an aerial route is less than 8 then the aerial route is safe for high weight cargos; if an estimated risk value for an aerial route1 is greater than 8 but less than 15 then the aerial route is moderately safe for high weight cargos; if an estimated risk value for an aerial route is greater than 15 but less than 25 then the aerial route is unsafe for high weight cargos but may be used for low weight cargos; and if an estimated risk value for an aerial route is greater than 25 then the aerial route 1 is unsafe for any navigation. In an example, the aerial route having a risk value greater than 25 may be avoided by using an alternative aerial route.

At 516, an aerial route from the aerial routes 306 and 310 having lowest risk value may be identified. In an example, the identified aerial route may be provided to the aerial vehicle 304 for navigation of the aerial vehicle and delivery of the cargo.

In one example, service providers may use the identified aerial route for generating navigation instructions for secure, optimal and efficient navigation through the geographic area 300. In an example, the navigation instructions generated for the aerial vehicle 304 may be used for applications of aerial vehicles for last mile delivery of cargos, such as medical supplies, electronic equipment, food, or other goods.

FIG. 6 illustrates a flowchart for implementation of an exemplary method 600 for generating navigation instructions for delivery of a cargo, in accordance with one or more example embodiments.

The method 600 may include, at step 602, obtaining geographic area information 108 relating to the geographic area 300 from the map database 106. The geographic area information 108 comprises, for example, building information indicating shape, structure, and design of the buildings 302 in the geographic area 300, floor value data indicating floor value of the buildings 302, and location information relating to the buildings 302. In an example, the geographic area information may further include weather information, historical risk data relating to one or more unmanned aerial vehicles (UAVs), lighting information, or traffic information.

The method 600 may include, at step 604, determining cargo information relating to a cargo. The cargo information may include, for example, weight information, dimension information, source location, destination location, and delivery instructions associated with delivery of the cargo. The delivery instructions may indicate, for example, a preferred aerial route, a preferred floor value, a preferred time of a day, a preferred aerial vehicle, etc.

The method 600 may include, at step 606, determining one or more aerial routes, such as the aerial routes 306 and 310, based on the geographic area information 108 and the cargo information. Based on the source location and the destination location, the one or more aerial routes 306 and 310 may be determined.

The method 600 may include, at step 608, estimating a risk value for each of the one or more aerial routes 306 and 310. In an example, the risk values are estimated based on a plurality of risk parameters and value of the aerial routes for the risk parameters. For example, individual risk values may be generated corresponding to each risk parameter associated with the cargo information, aerial vehicle attributes, etc. based on floor values for the aerial routes 306 and 310. Further, an aggregation of the individual risk values may be generated as the estimated risk value for the aerial routes 306 and 310.

The method 600 may include, at step 610, identifying an aerial route from the aerial routes 306 and 310 having lowest risk value.

The method 600 may include, at step 612, generating navigation instructions for the navigation of the aerial vehicle 304 based on the identified aerial route. The identified aerial route may be used for delivery of the cargo from the source location to the destination location, thereby generating navigation instructions based on the identified aerial route having lower risk values.

Accordingly, blocks of the methods 400, 500, and 600 support combinations of means for performing the specified functions and combinations of operations for performing the specified functions. It will also be understood that one or more blocks of the methods 400, 500, and 600, and combinations of blocks in the methods 400, 500, and 600, can be implemented by special purpose hardware-based computer systems which perform the specified functions, or combinations of special purpose hardware and computer instructions.

Alternatively, the system 102 may comprise means for performing each of the operations described above. In this regard, according to an example embodiment, examples of means for performing operations may comprise, for example, the processor 202 and/or a device or circuit for executing instructions or executing an algorithm for processing information as described above.

On implementing the methods 400, 500, and 600 disclosed herein, the end result generated by the system 102 is a tangible accurate risk value for low altitude aerial route for aerial vehicles, wherein such risk value may be used to estimate cost value, generate navigation instructions, identify ways to avoid or reduce risks, and ensure safety and reliability of navigation operation of the aerial vehicles.

Returning to FIG. 1, the communication network 104 may be wired, wireless, or any combination of wired and wireless communication networks, such as cellular, Wi-Fi, internet, local area networks, or the like. In some embodiments, the communication network 104 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In an example, the system 102 may be embodied as a cloud based service, a cloud based application, a cloud based platform, a remote server based service, a remote server based application, a remote server based platform, or a virtual computing system. In another example, the system 102 may be an OEM (Original Equipment Manufacturer) cloud. The OEM cloud may be configured to anonymize any data received by the system 102, before using the data for further processing, such as before sending the data to database 114. In an example, anonymization of the data may be done by the mapping platform 110.

The mapping platform 110 may comprise suitable logic, circuitry, and interfaces that may be configured to store and process information. The mapping platform 110 may also be configured to store and update data within the database 114. The mapping platform 110 may include or may be configured to perform techniques related to, but not limited to, geocoding, routing (multimodal, intermodal, and unimodal), clustering algorithms, machine learning in location based solutions, natural language processing algorithms, and artificial intelligence algorithms. Data for different modules of the mapping platform 110 may be collected using a plurality of technologies including, but not limited to drones, sensors, connected cars, cameras, probes, and chipsets. In some embodiments, the mapping platform 110 may be embodied as a chip or chip set. In other words, the mapping platform 110 may comprise one or more physical packages (such as, chips) that includes materials, components and/or wires on a structural assembly (such as, a baseboard).

In some example embodiments, the mapping platform 110 may include the processing server 112 for carrying out the processing functions associated with the mapping platform 110 and the database 114 for storing map data and other information. In an example, the database 114 may be the map database and may store the geographic area information 108 relating to geographic areas. In an embodiment, the processing server 112 may comprise one or more processors configured to process requests received from the system 102. The processors may fetch data from the database 114 and transmit the same to the system 102 in a format suitable for use by the system 102. The geographic area information may be collected from any sensor or database that may inform the mapping platform 110 or the database 114 of features within an environment of the geographic areas having aerial routes. For example, motion sensors, inertia sensors, image capture sensors, proximity sensors, LIDAR (light detection and ranging) sensors, and ultrasonic sensors may be used to collect the geographic area information. In some example embodiments, as disclosed in conjunction with the various embodiments disclosed herein, the system 102 may be used to process the geographic area information and the cargo information for estimating a risk value for the aerial routes 306 and 310 across the geographic area 300.

In some example embodiments, the database 114 may also be configured to receive, store, and transmit other sensor data and probe data including positional, speed, and temporal data received from vehicles, such as aerial vehicles. The probe data may be used to determine traffic volume, such as air traffic volume, associated with movement of vehicles on or along the aerial routes, such as the aerial routes 306 and 310 across the geographic area 300. The traffic volume associated with the aerial routes 306 and 310 may correspond to the vehicles travelling along the aerial routes 306 and 310 in the geographic area 300 at a given time period. In accordance with an embodiment, the probe data may include, but is not limited to, real time speed (or individual probe speed), incident data, geolocation data, timestamp data, and historical pattern data.

The database 114 may further be configured to store the traffic-related data and topology and geometry-related data for a route network, road network, and/or an air space routes, as map data. The map data may also include cartographic data, routing data, and maneuvering data.

For example, the data stored in the database 114 may be compiled (such as into a platform specification format (PSF)) to organize and/or processed for identifying aerial routes across geographic areas, estimating risk values of the aerial routes, determining historical risk data for the aerial routes and generate or update navigation-related entities and/or services, such as route calculation, route guidance, speed calculation, distance and travel time functions, navigation instruction generation, and other functions. The navigation-related entities may correspond to navigation through an identified aerial route having lowest risk value, re-routing of a route of operation, and other types of navigation functions. The compilation to produce the end user databases may be performed by a party or entity separate from the map developer. For example, a customer of the map developer, such as a navigation device developer or other end user device developer, may perform compilation on a received database in a delivery format to produce one or more compiled navigation databases.

Returning to FIG. 2, the processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining and/or multithreading. Additionally, or alternatively, the processor 202 may include one or more processors capable of processing large volumes of workloads and operations to provide support for big data analysis. In an example embodiment, the processor 202 may be in communication with the memory 204 via a bus for passing information among components of the system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor 202 may be specifically configured hardware for conducting the operations described herein.

Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202. The network environment, such as, 100 may be accessed using the I/O interface 206 of the system 102. The I/O interface 206 may provide an interface for accessing various features and data stored in the system 102.

In some example embodiments, the I/O interface 206 may communicate with the system 102 and displays input and/or output of the system 102. As such, the I/O interface 206 may include a display and, in some embodiments, may also include a keyboard, a mouse, a joystick, a touch screen, touch areas, soft keys, one or more microphones, a plurality of speakers, or other input/output mechanisms. In one embodiment, the system 102 may comprise user interface circuitry configured to control at least some functions of one or more I/O interface elements such as a display and, in some embodiments, a plurality of speakers, a ringer, one or more microphones and/or the like. The processor 202 and/or I/O interface 206 circuitry may be configured to control one or more functions of one or more I/O interface 206 elements through computer program instructions (for example, software and/or firmware) stored on a memory 204 accessible to the processor 202.

In some embodiments, the processor 202 may be configured to provide Internet-of-Things (IoT) related capabilities to users of the system 102 disclosed herein. The IoT related capabilities may in turn be used to provide smart city solutions by providing real time navigation output, big data analysis, and sensor-based data collection by using the cloud based mapping system for determining the difficulty factor for the geographic zone. The I/O interface 206 may provide an interface for accessing various features and data stored in the system 102.

The various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to “one embodiment” or “an embodiment” means that a particular feature, structure, or characteristic described in connection with the embodiment is included in at least one embodiment of the present disclosure. The appearance of the phrase “in one embodiment” in various places in the specification are not necessarily all referring to the same embodiment, nor are separate or alternative embodiments mutually exclusive of other embodiments. Further, the terms “a” and “an” herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms “data,” “content,” “information,” and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a “computer-readable storage medium,” which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system comprising:

a memory configured to store computer executable instructions; and one or more processors configured to execute the instructions to:

obtain geographic area information relating to a geographic area;

determine cargo information relating to a cargo;

determine one or more aerial routes for a delivery of the cargo based on the geographic area information and the cargo information;

estimate a risk value for navigation of an aerial vehicle across each of the one or more aerial routes, wherein the risk value is calculated based on floor values of the one or more aerial routes, trajectory curve information of the one or more aerial routes and the cargo information, wherein the trajectory curve information comprises a steepness, a sharpness, a curvature angle, or a combination thereof of the one or more aerial routes;

identify an aerial route from the one or more aerial routes having a lowest estimated risk value for the delivery of the cargo, based on the estimated risk values for the one or more aerial routes;

generate navigation instructions for the navigation of the aerial vehicle along the identified aerial route for the delivery of the cargo; and navigate the aerial vehicle based on the generated navigation instructions.

2. The system of claim 1, wherein the one or more processors are further configured to execute the instructions to:

identify a plurality of risk parameters based on the geographic area information and the cargo information; and estimate the risk value for each of the one or more aerial routes based at least in part on the plurality of risk parameters.

3. The system of claim 1, wherein the one or more processors are further configured to execute the instructions to:

determine an energy consumption estimation for each of the one or more aerial routes for the navigation of the aerial vehicle based on the geographic area information and the cargo information; and estimate the risk value for each of the one or more aerial routes based at least in part on the corresponding energy consumption estimation.

4. The system of claim 3, wherein the one or more processors are further configured to execute the instructions to:

obtain aerial vehicle attributes associated with the aerial vehicle;

determine the energy consumption estimation for each of the one or more aerial routes based on the cargo information, the geographic area information, and the aerial vehicle attributes; and estimate the risk value for the one or more aerial routes for the navigation of the aerial vehicle carrying the cargo based at least in part on the energy consumption estimation.

5. The system of claim 4, wherein the one or more processors are further configured to execute the instructions to:

identify the aerial route from the one or more aerial routes for the delivery of the cargo based on the aerial vehicle attributes, the cargo information, and the geographic area information.

6. The system of claim 1, wherein the obtained geographic area information comprises at least one of: building information, floor value data, and location information.

7. The system of claim 1, wherein a first risk value for a first aerial route from the one or more aerial routes is greater than a second risk value for a second aerial route from the one or more aerial routes when, at least one of: the floor value of the first aerial route is greater than the floor value of the second aerial route, a trajectory curvature angle of the first aerial route is greater than a trajectory curvature angle of the second aerial route.

8. The system of claim 1, wherein the cargo information includes at least one of: weight information, dimension information, source location, destination location, and delivery instructions for the delivery of the cargo.

9. A method, comprising:

obtaining geographic area information relating to a geographic area;

determining cargo information relating to a cargo;

determining one or more aerial routes for a delivery of the cargo based on the geographic area information and the cargo information;

estimating a risk value for navigation of an aerial vehicle across each of the one or more aerial routes, wherein the risk value is calculated based on floor values of the one or more aerial routes, trajectory curve information of the one or more aerial routes and the cargo information;

identifying an aerial route from the one or more aerial routes having lowest estimated risk value based on the estimated risk values for each of the one or more aerial routes, wherein the trajectory curve information comprises a steepness, a sharpness, a curvature angle, or a combination thereof of the one or more aerial routes;

generating navigation instructions for the navigation of the aerial vehicle along the identified aerial route for the delivery of the cargo; and navigating the aerial vehicle based on the generated navigation instructions.

10. The method of claim 9, further comprising:

identifying a plurality of risk parameters based on the geographic area information and the cargo information; and estimating the risk value for each of the one or more aerial routes based at least in part on the plurality of risk parameters.

11. The method of claim 9, further comprising:

determining an energy consumption estimation for each of the one or more aerial routes for the navigation of the aerial vehicle based on the geographic area information and the cargo information; and estimating the risk value for each of the one or more aerial routes based at least in part on the corresponding energy consumption estimation.

12. The method of claim 11, further comprising:

obtaining aerial vehicle attributes associated with the aerial vehicle;

determining the energy consumption estimation for each of the one or more aerial routes based on the cargo information, the geographic area information, and the aerial vehicle attributes; and estimating the risk value for the one or more aerial routes for the navigation of the aerial vehicle carrying the cargo based at least in part on the energy consumption estimation.

13. The method of claim 12, further comprising:

identify the aerial route from the one or more aerial routes for the delivery of the cargo based on the aerial vehicle attributes, the cargo information, and the geographic area information.

14. The method of claim 9, wherein the obtained geographic area information comprises at least one of: building information, floor value data, and location information.

15. The method of claim 9, wherein a first risk value for a first aerial route from the one or more aerial routes is greater than a second risk value for a second aerial route from the one or more aerial routes when, at let one of: the floor value of the first aerial route is greater than the floor value of the second aerial route, a trajectory curvature angle of the first aerial route is greater than a trajectory curvature angle of the second aerial route.

16. The method of claim 9, wherein the cargo information includes at least one of: weight information, dimension information, source location, destination location, and delivery instructions for the delivery of the cargo.

17. A computer programmable product comprising a non-transitory computer readable medium having stored thereon computer executable instructions, which when executed by one or more processors, cause the one or more processors to carry out operations comprising:

obtaining geographic area information relating to a geographic area;

determining cargo information relating to a cargo;

determining one or more aerial routes for a delivery of the cargo based on the geographic area information and the cargo information;

estimating a risk value for navigation of an aerial vehicle across each of the one or more aerial routes, wherein the risk value is calculated based on floor values of the one or more aerial routes, trajectory curve information of the one or more aerial routes and the cargo information;

identifying an aerial route from the one or more aerial routes having lowest estimated risk value based on the estimated risk values for each of the one or more aerial routes, wherein the trajectory curve information comprises a steepness, a sharpness, a curvature angle, or a combination thereof of the one or more aerial routes;

generating navigation instructions for the navigation of the aerial vehicle along the identified aerial route for the delivery of the cargo; and navigating the aerial vehicle based on the generated navigation instructions.

18. The computer programmable product of claim 17, the operations further comprising:

identifying a plurality of risk parameters based on the geographic area information and the cargo information; and estimating the risk value for each of the one or more aerial routes based at least in part on the plurality of risk parameters.

19. The computer programmable product of claim 17, the operations further comprising:

determining an energy consumption estimation for each of the one or more aerial routes for the navigation of the aerial vehicle based on the geographic area information and the cargo information; and estimating the risk value for each of the one or more aerial routes based at least in part on the corresponding energy consumption estimation.

20. The computer programmable product of claim 19, the operations further comprising:

obtaining aerial vehicle attributes associated with the aerial vehicle;

determining the energy consumption estimation for each of the one or more aerial routes based on the cargo information, the geographic area information, and the aerial vehicle attributes; and estimating the risk value for the one or more aerial routes for the navigation of the aerial vehicle carrying the cargo based at least in part on the energy consumption estimation.

* * * * *